(12) United States Patent
Volkov et al.

(10) Patent No.: US 7,085,853 B2
(45) Date of Patent: Aug. 1, 2006

(54) SYSTEM AND METHOD FOR A DISTRIBUTED SHELL IN A JAVA ENVIRONMENT

(75) Inventors: Alexei Volkov, Mountain View, CA (US); Allan S. Jacobs, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 744 days.

(21) Appl. No.: 10/241,300

(22) Filed: Sep. 10, 2002

(65) Prior Publication Data

US 2004/0049535 A1    Mar. 11, 2004

(51) Int. Cl.
*G06F 15/16* (2006.01)
(52) U.S. Cl. .................. 709/248; 709/201; 718/100
(58) Field of Classification Search ........... 709/201, 709/248; 718/106, 100
See application file for complete search history.

(56) References Cited

U.S. PATENT DOCUMENTS

| | | | | |
|---|---|---|---|---|
| 5,261,097 A | * | 11/1993 | Saxon | 718/106 |
| 5,946,463 A | * | 8/1999 | Carr et al. | 709/201 |
| 5,978,813 A | * | 11/1999 | Foltz et al. | 707/201 |
| 6,298,370 B1 | * | 10/2001 | Tang et al. | 718/102 |
| 6,434,594 B1 | * | 8/2002 | Wesemann | 709/201 |
| 6,560,636 B1 | * | 5/2003 | Cohen et al. | 709/203 |
| 2002/0019844 A1 | * | 2/2002 | Kurowski et al. | 709/201 |
| 2002/0083216 A1 | | 6/2002 | Hickson et al. | 709/319 |
| 2003/0177162 A1 | * | 9/2003 | Staiger et al. | 709/102 |

OTHER PUBLICATIONS http://dsh.sourceforge.net/manpage.htm, "Dsh man page", J. Rappleye, 2001.
http://java.sun.com/j2se/1.3/docs/guide/rmi/spec/rmi-objmodel7.html, Java Remote Method Invocation; 2- Distributed Object Model, 1997-1999.

* cited by examiner

*Primary Examiner*—Abdullahi E. Salad
(74) *Attorney, Agent, or Firm*—Martine Penilla & Gencarella, LLP (57) ABSTRACT

An invention is disclosed for a distributed shell for use in a distributed computer environment. The distributed shell includes a shell server, which is located on a server computer system. The shell server processes commands for distribution to particular client computer systems of the distributed computer system. In addition, the distributed shell includes a plurality of shell clients. Each shell client is executed on a separate client computer system and is in communication with the shell server. In operation, the shell server selects a particular shell client to perform a task or tasks in response to receiving a command. The tasks are then sent to the selected shell client and the shell client executes the task.

17 Claims, 5 Drawing Sheets

SYSTEM AND METHOD FOR A DISTRIBUTED SHELL IN A JAVA ENVIRONMENT

CROSS REFERENCE TO RELATED APPLICATIONS

This application is related to U.S. patent application Ser. No. 10/147,945, filed on May 16, 2002, and entitled "Distributed Test Harness Model," which is incorporated herein by reference.

BACKGROUND OF THE INVENTION

1. Field of the Invention

This invention relates generally to computer shell software, and more particularly to a distributed shell that provides distributed shell command control in a distributed computer environment.

2. Description of the Related Art

Current computer systems generally perform operations and interact with users and application programs utilizing an operating system, which typically includes a shell and a kernel. The shell is the interactive user interface of the operating system, which understands and executes the commands a user enters. In some systems, the shell is called a command interpreter. As the outer layer of an operating system, a shell can be contrasted with the kernel, the operating system's inmost layer or core of services.

Typically, a kernel includes an interrupt handler that handles all requests or completed I/O operations that compete for the kernel's services, a scheduler that determines which programs share the kernel's processing time in what order, and a supervisor that actually gives use of the computer to each process when it is scheduled. A kernel may also include a manager of the operating system's address spaces in memory or storage, sharing these among all components and other users of the kernel's services. A kernel's services are requested by other parts of the operating system or by an application through a specified set of program interfaces sometimes known as system calls.

Figure 1:
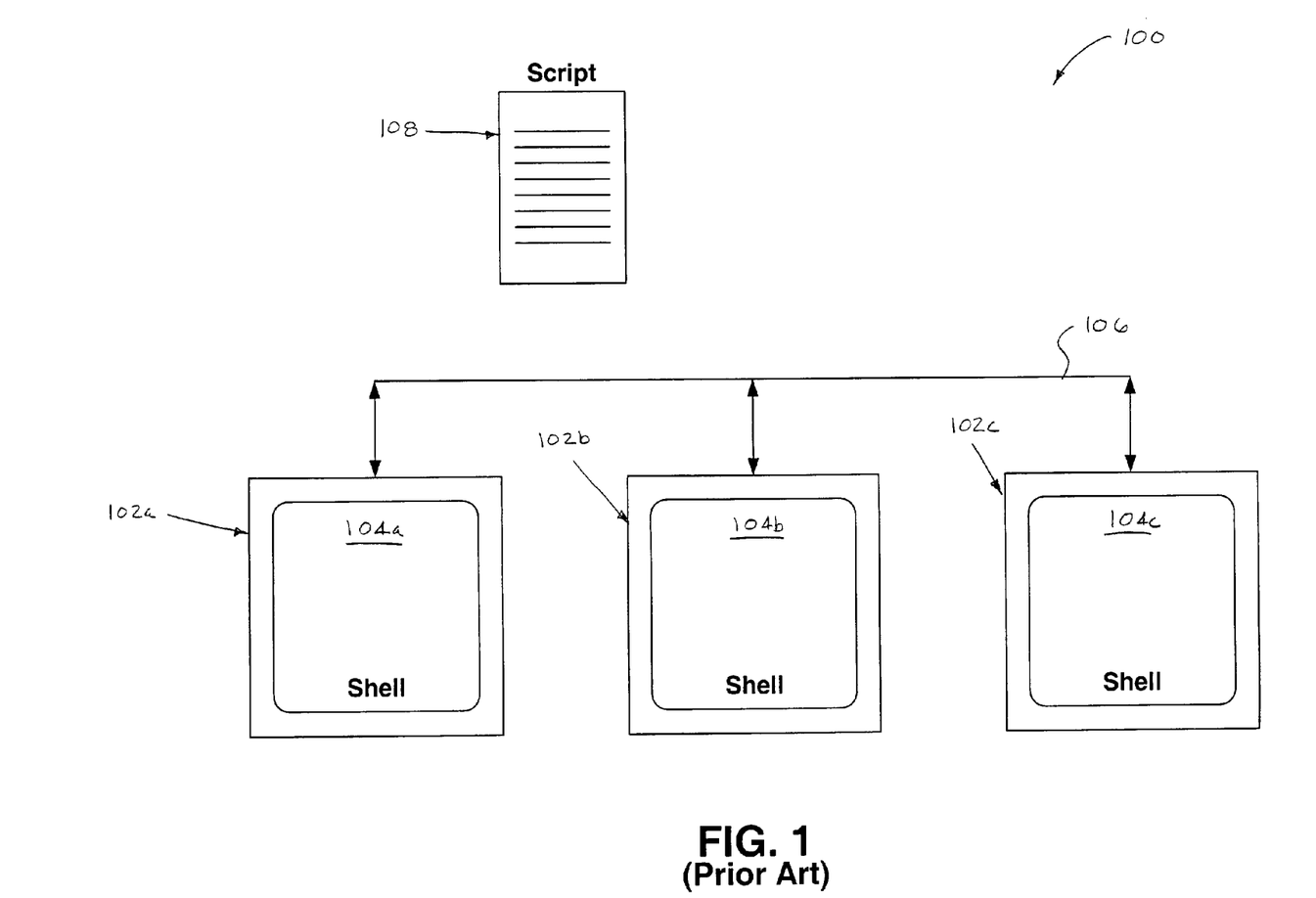
FIG. 1 is a block diagram showing a prior art distributed computer system that utilizes conventional shell.

Although a shell can be designed for a single computer system with relative ease, a shell for a distributed computer system is difficult to produce. FIG. 1 is a block diagram showing a prior art distributed computer system 100 that utilizes conventional shell programs. As shown in FIG. 1, the distributed computer system 100 includes a plurality of computer systems 102a–102c connected together via a network 106. In addition, each computer system 102a–102c includes a prior art shell 104a–104c to facilitate command interaction with a user.

As is well known, distributed computer systems 100 are often utilized to execute distributed applications, which generally comprise a plurality of independent tasks. The task independence allows the tasks to be executed in parallel on different computer systems 102a–102c to achieve faster execution of the application. To perform a distributed application, typically a script 108 is executed that defines how the application is to be executed. For example, the script 108 can include instructions on how to separate the tasks comprising the application and how to deploy the tasks to the various computer systems 102a–102c.

However, to program such functionality on a prior art shell 104a–104c requires hundreds of lines of code. Moreover, synchronization problems must be addressed, as well as output collection problems. Unfortunately, the prior art shell 104a–104c generally is designed to operate only on a single machine. Synchronization and output collection problems are left to the system developer and user to handle.

In view of the foregoing, there is a need for a distributed shell design that provides synchronization and output collection. Moreover, the distributed shell should allow commands to be processed in a distributed manner without requiring undue development time on the part of the user.

SUMMARY OF THE INVENTION

Broadly speaking, the present invention fills these needs by providing a distributed shell for use in a distributed computer environment. In one embodiment, the distributed shell includes a shell server that is located on a server computer system. The shell server processes commands for distribution to particular client computer systems of the distributed computer system. In addition to the shell server, the distributed shell includes a plurality of shell clients. Each shell client is executed on a separate client computer system and is in communication with the shell server. In operation, the shell server selects a particular shell client to perform a task or tasks in response to receiving a command. The tasks are then sent to the selected shell client and the shell client executes the task.

In an additional embodiment, a method for processing commands in a distributed shell environment is disclosed. The method includes receiving a command, which indicates a task to perform, at a shell server located on a server computer system. As above, the shell server is capable of processing commands for distribution to particular client computer systems. A particular shell client, from a plurality of shell clients executing on separate client computer systems, is selected to perform the task. The command then is transmitted to the selected shell client, which executes the task.

A shell server for use in a distributed shell environment having a plurality of shell clients is disclosed in a further embodiment of the present invention. The shell server includes a parser unit that processes received commands into specific tasks to be performed using a shell client. Also, a command delivery unit is included that is in communication with the parser unit. The command delivery unit creates a command object based on data received from the parser unit and transmits the command object to a selected shell client. The shell server further includes a synchronization unit that facilitates task synchronization based on filtered output received from shell clients. Optionally, the shell server can include an output collection unit that facilitates centralized output collection to a particular storage system. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a distributed shell for use in a distributed computer environment. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Considering the wide variety of server/client applications, there is a need to have a shell that can efficiently drive server and client side components and share available resources between the components. Embodiments of the present invention address this need by providing a distributed shell comprised of two components, a shell server and shell client. Broadly speaking, once a shell client connects to the shell server, the resources provided by the client computer become available to the system.

Figure 2A:
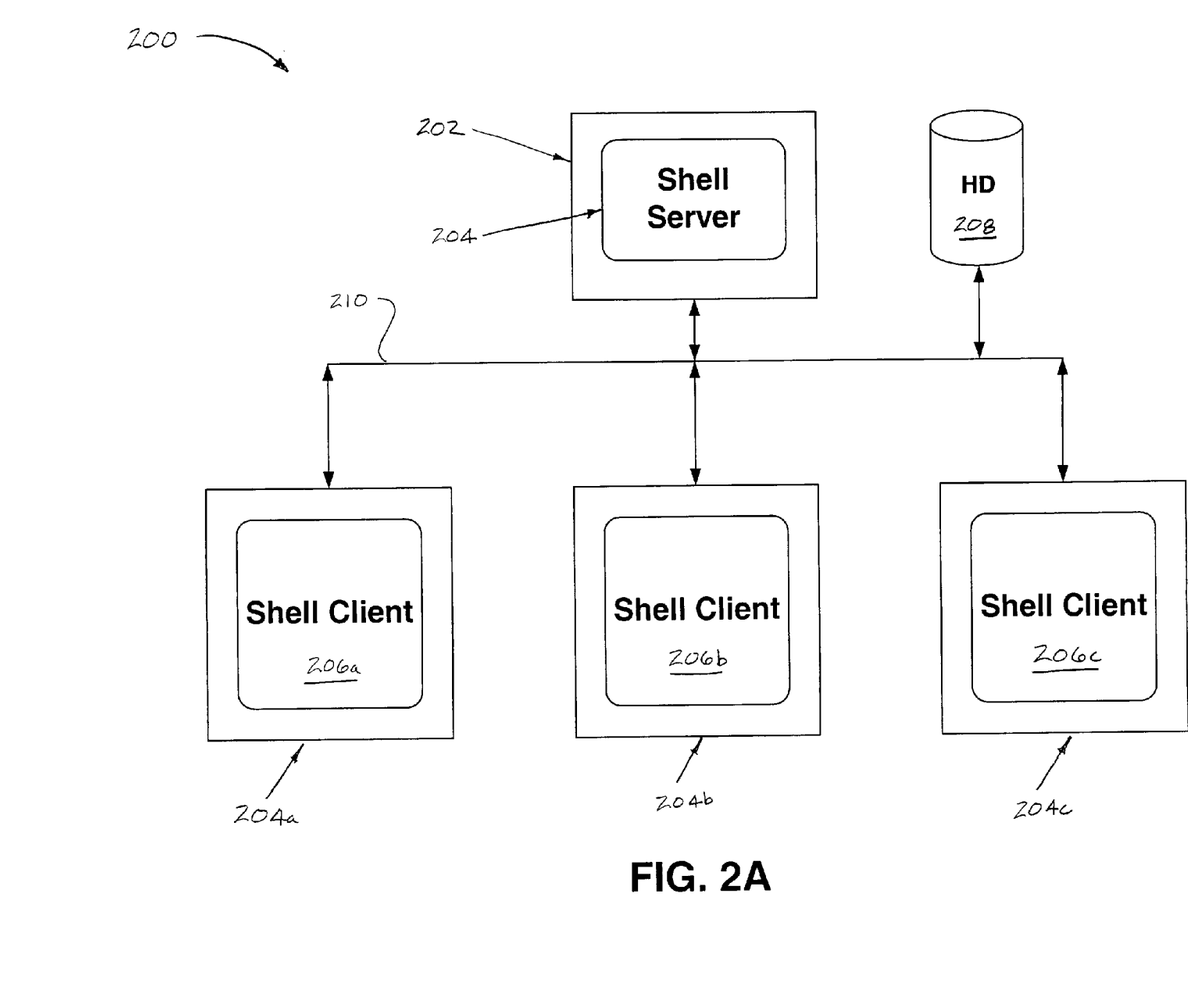
FIG. 2A is block diagram showing a distributed shell, in accordance with an embodiment of the present invention.

FIG. 2A is block diagram showing a distributed shell 200, in accordance with an embodiment of the present invention. As shown in FIG. 2A, a server computer 202 is connected to a plurality of client computers 204a–204c via a network 210. The distributed shell 200 comprises a shell server 204, which is executed on the server computer 202, and a plurality of shell clients 206a–206c each executed on a client computer 204a–204c. Each shell client 206a–206c is placed in communication with the shell server 204 using the network 210. In addition, a persistent storage device such as a hard drive 208 can be available to the server computer 202 and client computers 204a–204c via the network 210.

The shell server 204 functions as a system controller that can be utilized to provide control and synchronization for the shell clients 206a–206c. In operation, the shell server registers resources for the system based on the parameters of each client computer 204a–204c. Once the resources are registered, the user can provide commands to the shell server 204 using, for example, a command line, a menu, and/or a script file. The shell server 204 then processes the received command and determines which shell client 206a–206c, if any, should execute the command. For example, when a script file is provided to the shell server 204, the shell server 204 parses the commands to determine which tasks should be performed. The shell server 204 also determines which shell client 206a–206c should perform the tasks and passes any control parameters related to the task to the selected shell client 206a–206c.

As mentioned above, the shell server 204 provides synchronization and centralized output collection for the distributed shell 200. To provide this additional functionality, the shell server 204 is designed to recognize special keywords related to synchronization and output collection. Using these special keywords, the user can control task synchronization and output collection for a distributed application. For example, output collection keywords allow the user to define where the output should be collected. Thus, in the example of FIG. 2A, the user can define that all task output data from each shell client 206a–206c will be transmitted to the hard drive 208 for subsequent retrieval.

Figure 2B:
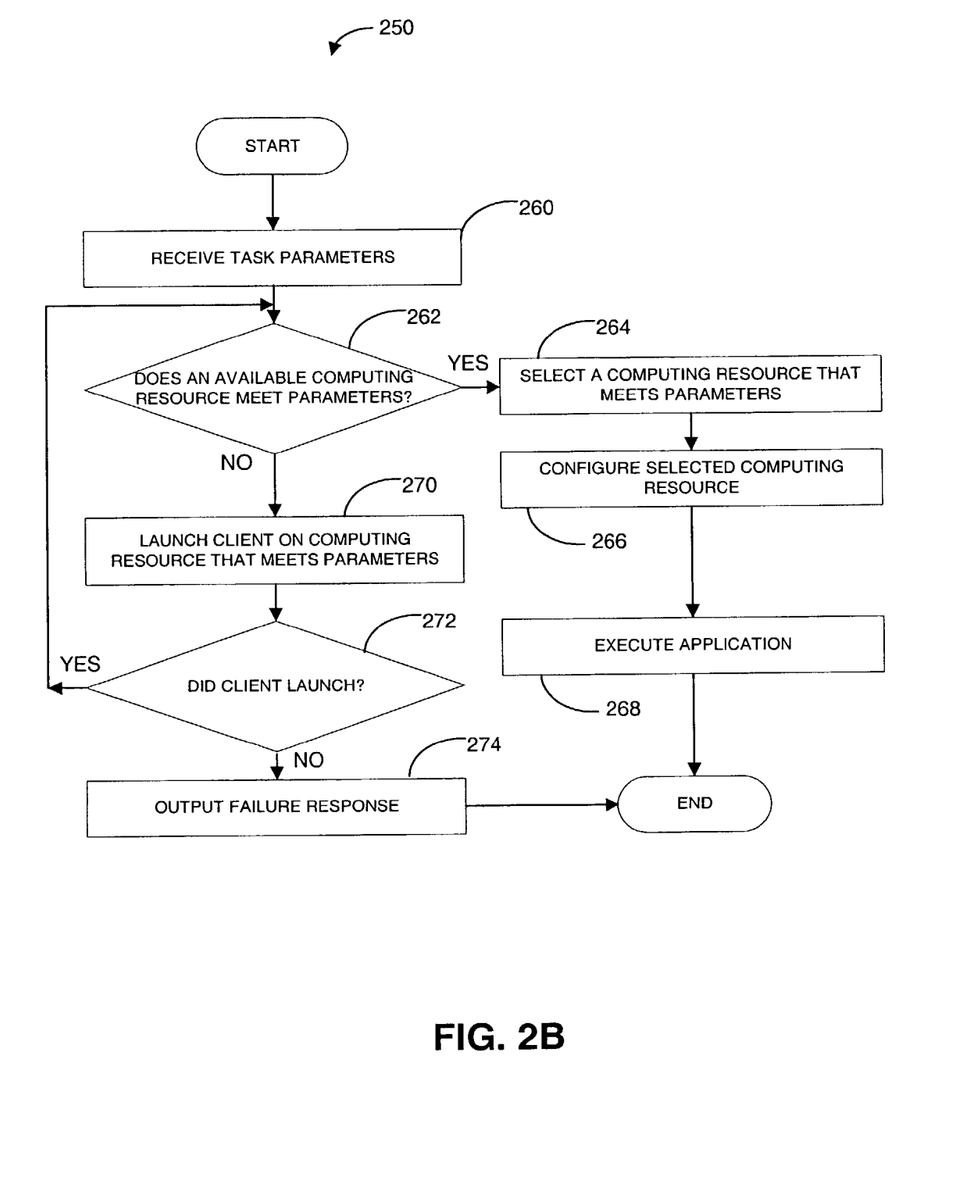
FIG. 2B is a flowchart diagram of a method of deploying a task, in accordance with one embodiment.

FIG. 2B is a flowchart diagram of a method 250 of deploying a task, in accordance with one embodiment. In operation 260, the shell server receives task parameters for the task to be launched. The task parameters generally include system requirements for the task such as the type of the computing resource (e.g., operating system, processor type, hardware configuration, software configuration, etc.) required to execute the task. In operation 262 the available computer resources (e.g., computer systems 204a–204c with the shell clients 206a–206c) are examined to determine if they meet the task parameters. For example, if the task parameters include an Intel x86 processor and the Linux operating system, and the computer system 204a is an Intel 486 processor with Linux operating system, the computer system 204a meets the task parameters. If one of the available computer systems 204a–204c meets the task parameters, the method 250 continues in operation 264.

In operation 264, a computer resource that meets the task parameters (e.g., computer system 202a) is selected and configured in accordance with the task parameters in operation 266. For example, the task parameters may include a requirement that another task be executing and available on the computer system 202a. Alternatively, a computer system may be busy executing another task that is undesirable to execute on the same computer system as the current task. In this example, a requirement may be that the undesired task must be ended (e.g., aborted), or the execution of the current task must be delayed until the undesired task has ended. In operation 268, the task is executed on the selected computer resource (e.g., computer system 202a) and the method operations for deploying the task end.

Returning to operation 262 above, if none of the available computer resources (e.g., computer systems 202a–202c) meet the task parameters, a shell client is launched on a computer resource that does meet the task parameters, in operation 270. In operation 272, the launch of the shell client on the computer resource is confirmed. If the shell client was successfully launched on the computer resource, the method 250 returns to operation 262 described above. However, if the shell client was not successfully launched on the computer resource, a failure response is output to the shell server in operation 274 and the method 250 end.

An example of a deploy statement for deploying a task such as task1 can include:

deploy task1 tcp_server

Which instructs the shell server to deploy an instance of the task tcp_server with the virtual name of task1. If the deploy statement deploys multiple instances of the task tcp_server, then a LOOPY symbol in an initialization file can be set with the value "1 2 3 4 5 6 7 8 9 10" and the deploy statement could use a loop function as follows:

```
for i in ${LOOPY}; do
    deploy tcp_client${i} tcp_client
done
```

The script will deploy ten distinct instances of tcp_client identified as tcp_client1 through tcp_client10.

The shell server can control a task that has been deployed on a computer running an instance of a shell client through scripts. For example if the deployed task must finish before one of the steps of the task can be executed, then the script can use a "wait completion" statement. The use of wait completion causes the script to wait for a task or for all tasks that match a pattern. By way of example, to wait for the shell server, a command can be used such as:

wait completion myserver

To wait for all of the clients to finish, an asterisk or other wild card can be used. For example the following statement can be used to cause the script to wait for all instances of the task tcp_client to finish before proceeding:

wait completion tcp_client*

Tasks can also be synchronized by passing string values between a shell client and the shell server. A task can output an event and the shell client can send the event to the shell server. Functional units in the shell server can receive the events from the shell client, as described subsequently. For example a script can include a wait statement that waits for an event output from a specific task.

Similarly, a task can receive an event from a post statement in the shell server. The post statement is output from the shell server to a shell client. The shell client filters the post statement from the shell server to meet the input requirements of the task. In one embodiment a task that communicates with the shell server and shell client can be deployed with a "-sync flag argument. For example:

deploy tcp_server-virtual_name tcp_server-sysnc

The shell can pause (e.g., temporarily stop execution) or wait until the tcp_server instance has reached a point in execution where the tcp_server instance is ready to receive data from other tasks. In one instance, the script can be set to wait for a message from tcp_server before continuing to the method operations that deploy shell clients or before shell clients launch tasks on the respective computer systems. In on embodiment, the tcp_server instance can send a "server-ready" string to the shell clients to indicate that tcp_server is ready to receive messages. Such a wait statement can use two arguments. The first argument is the task's virtual name and the second argument is the message string. For example:

wait tcp_server server_ready

The above statement will cause the task with the virtual name tcp_server to wait for the string "server_ready".

Sending a string to a task can be accomplished with a post statement. A post statement can take two arguments. The first argument is the virtual name of the task that is to receive the string and the second argument is the string. For example the following script will send the "server_ready" string to shell clients with virtual names tcp_client1, tcp_client2 . . . tcp_client10:

```
for i in ${LOOPY}; do
    post tcp_clients${i} server_ready
done
```

Figure 3:
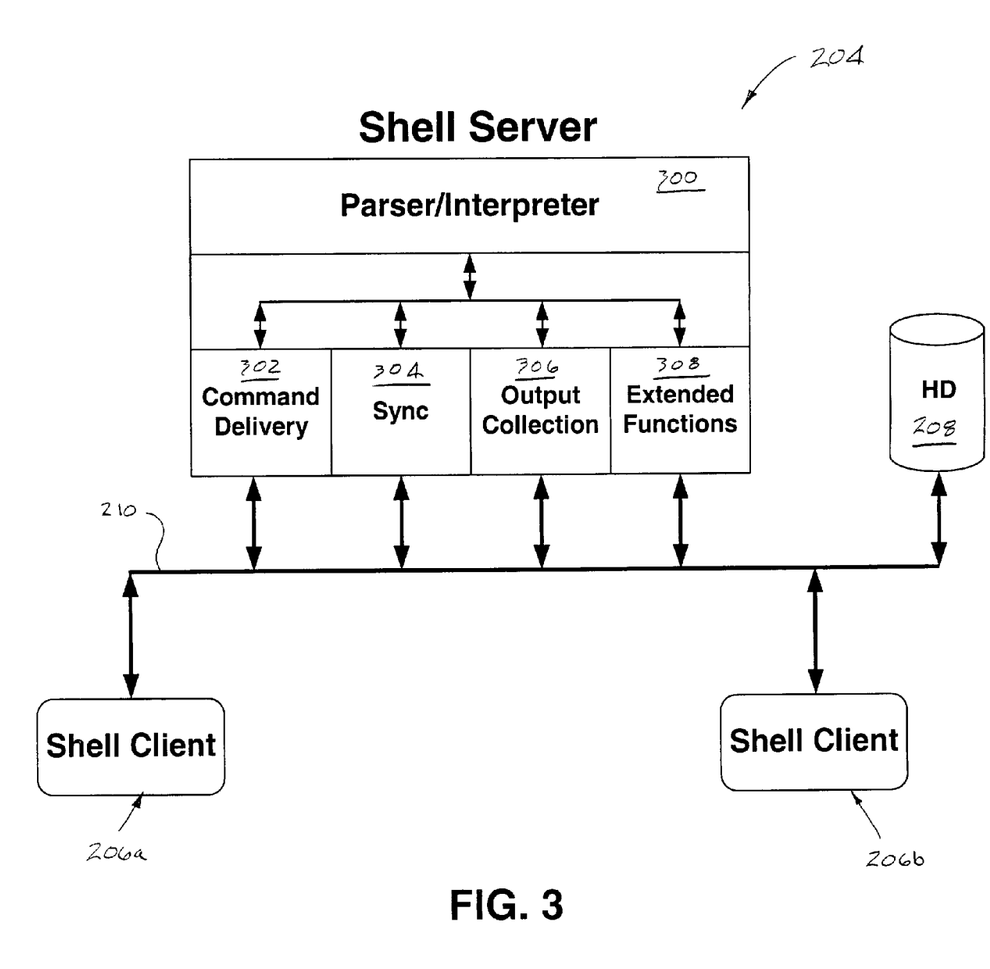
FIG. 3 is a block diagram showing a shell server, in accordance with an embodiment of the present invention.

FIG. 3 is a block diagram showing a shell server 204, in accordance with an embodiment of the present invention. The shell server 204 includes a parser/interpreter unit 300 in communication with a command delivery unit 302, a synchronization unit 304, an output collection unit 306, and any optional extended functions 308, described in greater detail subsequently. Each unit of the shell server 204 is in communication with the shell clients 206a–206b of the system via the network 210. As above, a persistent storage device can be accessible to the output collection unit 306 and shell clients 206a–206b through the network 210. In addition, it should be noted that the persistent storage device 208 can be remote, as illustrated in FIGS. 2 and 3, or local to the server computer or a client computer.

In operation, the parser/interpreter 300 receives and processes commands and script files and converts them into the tree of commands, which will be executed using the shell clients. The user can enter commands using a command line. In addition, the user can provide script files to the parser/interpreter 300. For example, the script file can include instructions on how to separate tasks comprising an application and how to deploy the tasks to the various computer systems comprising the distributed computer system. Once commands are parsed and interpreted, the shell server 204 can utilize any of the functional units to facilitate performance of the command.

The command delivery unit 302 is responsible for delivering information back and forth between the shell server 204 and the shell clients 206a–206b. Once a command has been parsed and interpreted, the parser/interpreter unit 300 sends the command to the command delivery unit 302, which determines which shell client 206a–206b should perform the command. The command delivery unit 302 then constructs a proper command object and transmits the command object to the selected shell client 206a–206b.

The synchronization unit 304 is utilized for command and task synchronization. As mentioned above, the parser/interpreter 300 is designed to recognize special keywords related to synchronization. Using these special keywords, the user can control task synchronization for a distributed application. For example, the user can utilize special keywords to synchronize related tasks based on particular events.

The synchronization unit 304 synchronizes based on output. In particular, the synchronization unit 304 is connected to a filtered output of each shell client 206a–206b. As will be described in greater detail subsequently, each shell client provides a filtered output designed for use with the synchronization unit 304. In operation, the synchronization unit 304 monitors received filtered output signals for specific patterns that indicate a particular event has occurred. The synchronization unit 304 then takes appropriate action to ensure a particular, predefined reaction occurs.

For example, a user can use a special synchronization command to indicate that a particular command 2 should not be performed until a particular command 1 is complete. The command delivery unit 302 then delivers the command 1 object to, for example, shell client 206a, which begins executing the command 1. The synchronization unit 304 then monitors the filtered output of shell client 206a to determine when command 1 is completed. At that point, the synchronization unit 304 triggers the command delivery unit 302 to deliver the command 2 object to, for example, shell client 206b. Although the above example illustrates synchronization based on task completion, it should be noted that synchronization can be based on any recognizable event.

The output collection unit 306 is utilized to facilitate central output collection. As discussed above, embodiments of the present invention utilize special keywords related to output collection such that a user can control output collection for a distributed application. For example, output collection keywords allow the user to define where the output should be collected. Thus, the user can define, for example, that all task output data from each shell client 206a–206b should be transmitted to a particular external hard drive for subsequent retrieval.

For distributed tasks it often is important to have a central output collection. In this manner, users are not required to manually collect data from a plurality of computer systems before data analysis can occur. Hence, task output is provided to the output collection unit 306 for central output collection. The output collection unit 306 then transmits the collected output data to a particular storage device. As mentioned previously, the central storage device can be a separate dedicated storage device, such as hard drive 208, or located locally to one of the shells, such as the shell server 204 or a client shell 206a–206b. In addition, it should be noted that the output collection unit 306 can be utilized to coordinate central output collection without actually receiving all task output. For example, embodiments of the present invention can utilize the output collection unit 306 to direct the shell clients 206a206b to send all task output to a particular storage device, such as storage device 208.

Additional functionality can be added to the shell server 204, as illustrated by the extended functions unit 308 of FIG. 3. The exact number and functionality of the extended functions 308 is generally determined by the user's needs. For example, one extended function 308 can be a dataflow unit. The dataflow unit can control the flow of special files required by tasks. For example, when a task requires a specific data file, the dataflow unit can facilitate delivery of the particular data file the requesting task.

As with all the above described functional units, the dataflow unit can be utilized in conjunction with the synchronization unit 304. For example, the synchronization unit 304 can monitor the filtered output of a task to determine when the task requires a separate data file. Once detected, the synchronization unit 304 can trigger the dataflow unit to deliver the particular data file to the task.

Figure 4:
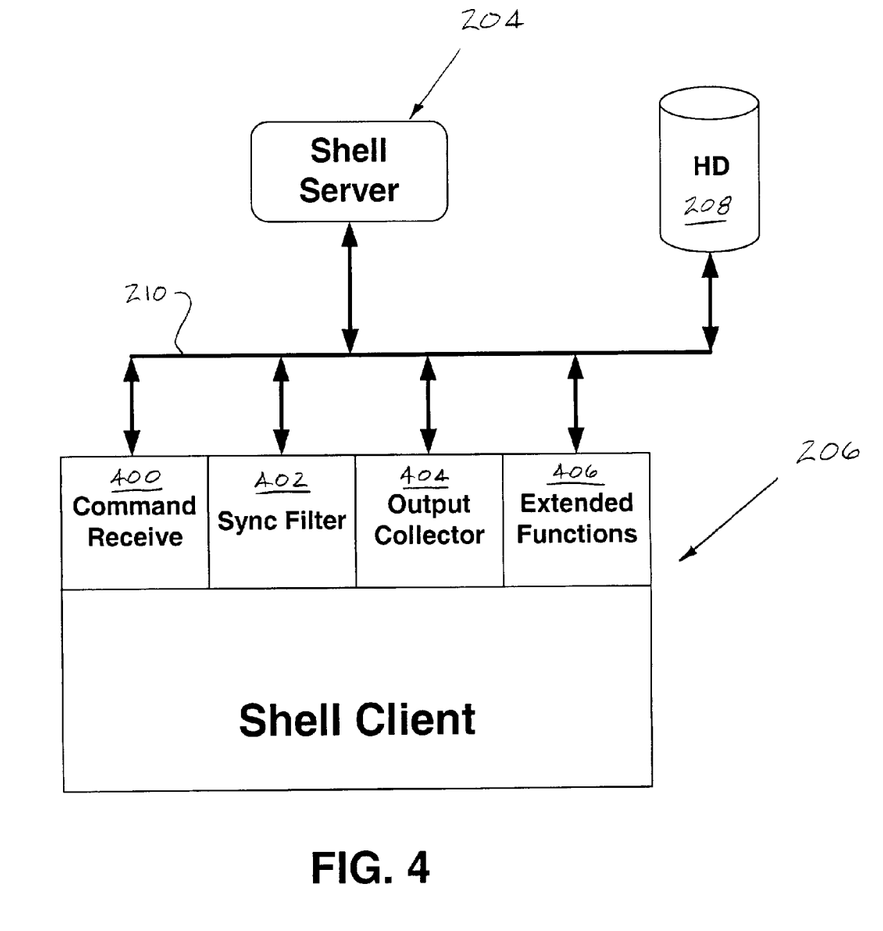
FIG. 4 is a block diagram showing a shell client, in accordance with an embodiment of the present invention.

FIG. 4 is a block diagram showing a shell client 206, in accordance with an embodiment of the present invention. The shell client 206 includes a command receive unit 400, a synchronization filter unit 402, an output collector unit 404, and any optional extended functions 406, described in greater detail subsequently. Each unit of the shell client 206 is in communication with the shell server 204 via the network 210. In addition, a persistent storage device can be accessible to the output collector unit 208 through the network 210. As above, it should be noted that the persistent storage device 208 can be remote or local to the server computer or a client computer.

In operation, the command receive unit 400 receives command objects from the command delivery unit of the shell server 204. As discussed above, the parser/interpreter unit in the shell server 204 sends the command to the command delivery unit of the shell server 204, which determines which shell client 206 should perform the command. The command delivery unit then constructs a proper command object and transmits the command object to the selected shell client 206. The command object is then received by the command receive unit 400. Thereafter, the command receive unit 400 analyzes the received command object and begins to execute the command.

The synchronization filter unit 402 is utilized for command and task synchronization on the shell client 206. As mentioned above, the parser/interpreter of the shell server 204 is designed to recognize special keywords related to synchronization. Using these special keywords, the user can control task synchronization for a distributed application. Since the synchronization unit of the shell server 204 synchronizes based on output, the synchronization filter unit 402 provides filtered output to the synchronization unit of the shell server 204. In particular, the synchronization filter unit 402 is connected to the synchronization unit of the shell server 204. As each task is executed, the synchronization filter applies a filter to the output generated by the task and transmits the filtered task output to the shell server 204. In this manner, the synchronization unit of the shell server 204 can monitor the filtered task output for specific patterns that indicate a particular event has occurred. The synchronization unit of the shell server can then take appropriate action to ensure a particular, predefined reaction occurs.

The output collector unit 404 is utilized to facilitate central output collection. As discussed above, embodiments of the present invention utilize special keywords related to output collection such that a user can control output collection for a distributed application. For example, output collection keywords allow the user to define where the output should be collected. Thus, the user can define, for example, that all task output data from each shell client 206 should be transmitted to a particular external hard drive 208 for subsequent retrieval.

In operation, the output collector unit 404 collects task generated output from tasks executed on the shell client 206. The collected output can then be provided to the output collection unit of the shell server 204 for central output collection. As mentioned above, the output collection unit of the shell server 204 transmits the collected output data to a particular storage device, which can be a separate dedicated storage device, such as hard drive 208, or located locally to one of the shells, such as the shell server 204 or a client shell 206. In further embodiments, the output collector unit 404 can be directed by the output collection unit of the shell server 204 to transmit task collected output to a particular storage device directly. For example, the shell server 204 can direct the output collector unit 404 to send all task output to the storage device 208.

Additional functionality can be added to the shell client 206, as illustrated by the extended functions unit 406 of FIG. 4. The exact number and functionality of the extended functions 406 is generally determined by the user's needs. To continue the above example, an extended function 406 can be a data receive unit. The data receive unit can direct the flow of special files received from a dataflow unit to the specific requesting task. For example, when a task requires a specific data file, the dataflow unit can facilitate delivery of the particular data file from the shell server 204 to the data receive unit of the shell client 206. The data receive unit then facilitates delivery of the data file to the requesting task.

Although the present invention mainly describes exemplary embodiments of a distributed test framework system designed to execute a test suite, it must be understood by one having ordinary skill in the art that the distributed processing framework of the present invention can be implemented to run any computer process. Additionally, although certain embodiments of the present invention are described based on the Jini technology, other network technologies having the capability to create an ad-hoc group of computer resources may be implemented (e.g., RMI, TCP/IP Sockets, etc.). Furthermore, although the present invention implements Java programming language, other programming languages may be used to implement the embodiments of the present invention (e.g., C, $C_{++}$, any object oriented programming language, etc.).

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data that can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in FIG. 2B are not required to be performed in the order illustrated, and that all the processing represented by the operations may not be necessary to practice the invention. Further, the operations described in FIG. 2B can also be implemented in software stored in any one of or combinations of the memory types in a standard or special purpose computer.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A distributed shell for use in a distributed computer environment where the distributed shell enables sharing of resources, comprising:
    a shell server located on a server computer system, the shell server being capable of processing commands for distribution to particular client computer systems, the shell server includes a synchronization unit that facilitates task synchronization; and
    a plurality of shell clients, each shell client executed on a separate client computer system, each shell client being in communication with the shell server, the shell client includes a synchronization filter to filter outputs from the shell client, the synchronization filter of the shell client configured to be connected to the synchronization unit of the shell server,
    wherein the shell server selects a particular shell client to perform a task in response to receiving a command, and wherein the selected shell client executes the task, whereby the synchronization unit facilitates task synchronization by monitoring filtered output received from the synchronization filters of the plurality of shell clients for specific patterns, and the shell server further includes an output collection unit to collect the filtered output received from the plurality of shell clients.

2. A distributed shell as recited in claim 1, wherein the shell server includes a parser unit that processes received commands into specific tasks to be performed using a shell client.

3. A distributed shell as recited in claim 2, wherein the shell server includes a command delivery unit that delivers tasks to selected shell clients.

4. A distributed shell as recited in claim 3, wherein the command delivery unit creates a command object based on data received from the parser unit, and wherein the command object is transmitted to a shell client.

5. A distributed shell as recited in claim 1, wherein the synchronization filter filters task output and provides the filtered task output to the synchronization unit.

6. A distributed shell as recited in claim 1, wherein the output collection unit facilitates centralized output collection to a particular storage system.

7. A distributed shell as recited in claim 6, wherein the output collection unit receives output data from an output collector unit resident on each shell client and transmits the output data to the particular storage system, the output collector unit of each shell client configured to be connected to the output collection unit of the shell server.

8. A distributed shell as recited in claim 6, wherein the output collection unit instructs each shell client to transmit output data from an output collector unit resident on each shell client to the particular storage system, the output collector unit of each shell client configured to be connected to the output collection unit of shell server and to the particular storage system.

9. A method for processing commands in a distributed shell environment where the distributed shell enables sharing of resources, comprising the operations of:
    receiving a command at a shell server located on a server computer system, the shell server being capable of processing commands for distribution to particular client computer systems, wherein the command indicates a task to perform;
    selecting a shell client to perform the task, the selected shell client being one of a plurality of shell clients each executed on a separate client computer system, wherein each shell client is in communication with the shell server, the shell client includes a synchronization filter to filter outputs from the shell client, the synchronization filter of the shell client configured to be connected to the synchronization unit of the shell server;
    transmitting the command to the selected shell client, wherein the selected shell client executes the task;
    providing task synchronization by monitoring filtered output received from the synchronization filters of the plurality of shell clients for specific patterns; and
    providing Output collection to collect the filtered output received from the plurality of shell clients.

10. A method as recited in claim 9, further comprising the operation of processing the received command into at least one specific task to be performed using a shell client.

11. A method as recited in claim 10, further comprising the operation of generating a command object based on the received command and transmitting the command object to a shell client.

12. A method as recited in claim 9, wherein the operation of providing output collection further comprising the operation of receiving output data at the shell server from an output collector unit resident on each shell client and transmitting the output data to a particular storage system, the output collector unit of each shell client configured to be connected to the output collection unit of the shell server.

13. A method as recited in claim 9, wherein the operation of providing an output collection further comprising the operation of instructing each shell client to transmit output data from an output collector unit resident on each shell client to a particular storage system, the output collector unit of each shell client configured to be connected to the output collection unit of the server and to the particular storage system.

14. A shell server for use in a distributed shell environment having a plurality of shell clients where the distributed shell enables sharing of resources, comprising:
   a parser unit that processes received commands into specific tasks to be performed using a shell client;
   a command delivery unit in communication with the parser unit, the command delivery unit capable of creating a command object based on data received from the parser unit, and transmitting the command object to a selected shell client;
   a synchronization unit that facilitates task synchronization by monitoring filtered output received from the plurality of shell clients for specific patterns, each shell client having a synchronization filter to collect the filtered outputs, the synchronization filter of each shell client configured to be connected to the synchronization unit of the shell server; and
   an output collection unit that facilitates collection of filtered output received from the plurality of shell clients.

15. A shell server as recited in claim 14, wherein the output collection unit facilitates centralized output collection to a particular storage system.

16. A shell server as recited in claim 15, wherein the output collection unit receives output data from an output collector unit resident on each shell client and transmits the output data to the particular storage system, the output collector unit of the shell client configured to be connected to the output collection unit of the shell server.

17. A distributed shell as recited in claim 15, wherein the output collection unit instructs each shell client to transmit output data from an output collector unit resident on each shell client to the particular storage system, the output collector unit of each shell client configured to be connected to the output collection unit of the shell server and to the particular storage system.

* * * * *